United States Patent
Wang et al.

(10) Patent No.: US 11,268,631 B2
(45) Date of Patent: Mar. 8, 2022

(54) MICROFLUIDIC VALVE AND A CHIP OR SYSTEM COMPRISING THE MICROFLUIDIC VALVE

(71) Applicant: CapitalBio Corporation, Beijing (CN)

(72) Inventors: Lei Wang, Beijing (CN); Yao Zhou, Beijing (CN); Hu Wang, Beijing (CN); Mingxian Lin, Beijing (CN); Tongjun Wang, Beijing (CN); Liang Bai, Beijing (CN); Guoliang Huang, Beijing (CN); Dong Wang, Beijing (CN); Wanli Xing, Beijing (CN)

(73) Assignee: CAPITALBIO CORPORATION, Beijing (CN)

( * ) Notice: Subject to any disclaimer, the term of this patent is extended or adjusted under 35 U.S.C. 154(b) by 268 days.

(21) Appl. No.: 15/757,321

(22) PCT Filed: Sep. 30, 2016

(86) PCT No.: PCT/CN2016/000549
§ 371 (c)(1),
(2) Date: Mar. 2, 2018

(87) PCT Pub. No.: WO2017/054369
PCT Pub. Date: Apr. 6, 2017

(65) Prior Publication Data
US 2018/0266586 A1    Sep. 20, 2018

(30) Foreign Application Priority Data
Sep. 30, 2015 (CN) .......................... 201510640002.1

(51) Int. Cl.
*F16K 99/00* (2006.01)
*B01F 5/00* (2006.01)
(Continued)

(52) U.S. Cl.
CPC .......... *F16K 99/0013* (2013.01); *B01F 5/008* (2013.01); *B01F 13/0064* (2013.01);
(Continued)

(58) Field of Classification Search
CPC ............. F16K 99/0013; F16K 99/0063; F16K 99/0028; F16K 99/0025; F16K 2099/0084;
(Continued)

(56) References Cited

U.S. PATENT DOCUMENTS 5,310,523 A * 5/1994 Smethers ............. C12Q 1/6813
422/404
7,582,472 B2 * 9/2009 Smith .................. B01L 3/5025
435/288.4
(Continued)

FOREIGN PATENT DOCUMENTS

CN        1385697 A       12/2002
CN        101907631 B     7/2012
(Continued)

OTHER PUBLICATIONS

International Search Report for PCT/CN2016/000549, dated Dec. 21, 2016, 2 pages.
(Continued)

*Primary Examiner* — Lore R Jarrett
(74) *Attorney, Agent, or Firm* — Rimon, P.C.

(57) ABSTRACT

A microfluidic valve provided herein is configured to mix or capable of mixing a sample and/or a reagent in addition to controlling liquid flow. In one embodiment, the microfluidic valve comprises a rotor (3) and one or more micro-structures (2) that move with the rotation of the rotor (3). In one embodiment, the one or more micro-structures (2) stir and/or mix content in a mixing chamber (5) formed by the rotor (3), a base (1), and a sleeve (4) of the microfluidic valve. A
(Continued)

microfluidic chip or chip system comprising one or more of the microfluidic valves, and methods of use, are also provided.

22 Claims, 7 Drawing Sheets

(51) Int. Cl.
*B01F 13/00* (2006.01)
*B01L 3/00* (2006.01)

(52) U.S. Cl.
CPC .... *B01L 3/502738* (2013.01); *F16K 99/0025* (2013.01); *F16K 99/0028* (2013.01); *F16K 99/0063* (2013.01); *B01L 2200/0647* (2013.01); *B01L 2300/0816* (2013.01); *B01L 2300/0867* (2013.01); *B01L 2300/0874* (2013.01); *B01L 2400/0644* (2013.01); *F16K 2099/0084* (2013.01)

(58) Field of Classification Search
CPC ............. F16K 99/0046; F16K 99/0011; B01F 13/0064; B01F 5/008; B01L 3/502738; B01L 2300/0867; B01L 2300/0874; B01L 2400/0644; B01L 2300/0816; B01L 2200/0647
See application file for complete search history.

(56) References Cited

U.S. PATENT DOCUMENTS

| | | | |
|---|---|---|---|
| 7,985,376 B2 | 7/2011 | Biwa et al. | |
| 8,033,976 B2 * | 10/2011 | Mitchelson | B04B 5/0442 494/1 |
| 7,981,386 B2 | 12/2011 | McAvoy et al. | |
| 2003/0162304 A1 * | 8/2003 | Dority | G01N 1/18 436/180 |
| 2009/0314971 A1 | 12/2009 | McAvoy et al. | |
| 2010/0028204 A1 * | 2/2010 | Lee | B01L 3/502 422/68.1 |
| 2014/0099646 A1 * | 4/2014 | Connolly | B01L 3/502 435/6.12 |
| 2018/0266586 A1 | 9/2018 | Wang et al. | |

FOREIGN PATENT DOCUMENTS

| | | |
|---|---|---|
| CN | 105135051 A | 12/2015 |
| EP | 2775183 A2 | 9/2014 |
| JP | 2011145185 A | 1/2010 |
| JP | 2012522996 A | 9/2012 |
| WO | 2010115192 A3 | 1/2011 |
| WO | 2014011115 A1 | 1/2014 |

OTHER PUBLICATIONS

International Preliminary Report on Patentability for PCT/CN2016/000549, dated Apr. 3, 2018, 5 pages.
Extended European Search Report for European patent application EP16850004.9, dated Feb. 19, 2019, 7 pages.
Communication pursuant to Article 94(3) EPC for European patent application EP16850004.9, dated Dec. 30, 2019, 3 pages.
Communication pursuant to Article 94(3) EPC for European patent application EP16850004.9, dated Aug. 24, 2020, 4 pages.
Response to Communication pursuant to Article 94(3) EPC for European patent application EP 16850004.9, dated Oct. 27, 2020, 2 pages.
Claims for European patent application EP16850004.9, dated Oct. 27, 2020, 2 pages.
Annex to EPO Form 2004, Communication pursuant to Rule 71(3) EPC for European patent application EP16850004 9, dated Nov. 19, 2020, 52 pages.
Notice of reason for refusal for Japanese patent application JP2018-516678, dated Aug. 18, 2020, 6 pages with extra 6 pages of English language equivalent or summary.
The Response to Office Action and Amended Claims in reply to the refusal of JP2018-516678 dated Aug. 18, 2020, 5 pages in total with extra 6 pages of Applicant's instructions for the response to the refusal of JP2018-516678 dated Aug. 18, 2020.
Notice of reason for refusal for Japanese patent application JP2018-516678, dated Dec. 22, 2020, 3 pages with extra 3 pages of English language equivalent or summary.
Applicant's Response to Reasons for refusal of JP2018-516678, dated Dec. 22, 2020, 5 pages.
1st Office Action for Chinese patent application CN201510640002.1, dated Mar. 5, 2019, 6 pages.
Written Opinion for Japanese patent application JP2018-516678, dated Feb. 10, 2021, 2 pages.
Amendments for Japanese patent application JP2018-516678, dated Feb. 10, 2021, 2 pages.
Notice of Grant for Japanese patent application JP2018-516678, dated Mar. 2, 2021, 3 pages.

* cited by examiner

MICROFLUIDIC VALVE AND A CHIP OR SYSTEM COMPRISING THE MICROFLUIDIC VALVE

CROSS REFERENCE TO RELATED APPLICATIONS

The present application is a U.S. national phase application of International Patent Application No. PCT/CN2016/000549, having an international filing date of Sep. 30, 2016, which claims benefit of priority to Chinese Patent Application No. 201510640002.1, filed on Sep. 30, 2015, the contents of which applications are incorporated by reference herein in their entireties for all purposes.

TECHNICAL FIELD

The present disclosure generally relates to the field of microfluidic devices and methods of use, for example, for detection and/or analysis of biological molecules. In particular aspects, the present disclosure relates to microfluidic techniques, and more particularly, to a microfluidic valve, a microfluidic chip, a kit, or a system comprising one or more of the microfluidic valves, and methods of the using the valve, chip, kit, or system for processing samples and/or reagents (such as mixing), conducting reactions, and/or detecting or analyzing an analyte.

BACKGROUND

A microfluidic chip typically can accurately control fluid movement inside the chip by way of using a microfluidic valve. Current microfluidic valves control fluid movement through the combination of fluidic structures at the bottom of a rotor (such as a channel through the rotor itself) and through-holes in a base that lead to one or more fluid channels. These microfluidic valves achieve multiplexing among different fluid channels through the rotation of the rotor in order to connect a channel inside the rotor itself to certain target fluid channels.

However, such microfluidic valves only achieve the function of an on/off switch of a fluid path. Additional fluidic manipulations, such as mixing and reaction, usually require introduction of separate mechanisms, resulting in an increased number of fluidic components and/or more complex structures on the chip, and hence difficulty in chip assembly.

Therefore, a new type of microfluidic valve is needed, which integrates the mixing function and reduces the number of components for ease of assembly. The present disclosure addresses this and related needs.

SUMMARY

The summary is not intended to be used to limit the scope of the claimed subject matter. Other features, details, utilities, and advantages of the claimed subject matter will be apparent from the detailed description including those aspects disclosed in the accompanying drawings and in the appended claims.

The liquid flow inside a microfluidic device typically can be precisely controlled in a chip by using a microvalve. In one aspect, an objective of the present disclosure is to provide a microfluidic valve with a mixing function, thereby reducing the number of components mounted on the microfluidic chip for ease of assembly.

In one aspect, provided herein is a microfluidic valve and a microfluidic chip comprising the valve, the microfluidic valve comprising: a base, wherein an aperture, e.g., a micropore, is provided in the base; a sleeve disposed on the base; a rotatable rotor disposed within the sleeve, located on the end of the sleeve away from the base, wherein the rotor, the sleeve, and the base form a mixing chamber. In one aspect, the micropore is configured to communicate or capable of communicating with the mixing chamber. In one aspect, a micro-column is disposed on the rotor and located in the mixing chamber. In some embodiments, the micropore can be closed by the micro-column.

In another aspect, the present disclosure provides a microfluidic valve, which through the rotation of the rotor, not only can function as an on/off switch of the aperture, e.g., the micropore, provided on the base, but also can mix and/or agitate a liquid in the mixing chamber. Therefore, in one aspect, the microfluidic valve not only controls on-off of flow path but also stirs the fluid, so as to reduce the number of parts provided in a micro-fluidic chip and facilitate assembly.

In one other aspect, provided herein is a microfluidic valve which comprises a base, the base comprising an aperture, e.g., a micropore. In one embodiment, the microfluidic valve further comprises a sleeve disposed on the base.

In any of the preceding embodiments, a rotatable rotor can be disposed within the sleeve. In any of the preceding embodiments, the rotor can be disposed on the end of the sleeve away from of the base. In any of the preceding embodiments, the rotor, the sleeve, and the base can form a mixing chamber. In any of the preceding embodiments, the aperture, e.g., the micropore, is configured to communicate or capable of communicating with the mixing chamber. In any of the preceding embodiments, a micro-column can be disposed on the rotor and located in the mixing chamber. In any of the preceding embodiments, the micro-column can block or close the communication between the micropore and the mixing chamber.

In any of the preceding embodiments, the rotor, on its end surface away from the base, can comprise an interface structure for rotating the rotor. In any of the preceding embodiments, the interface structure can optionally comprise a bump, a groove, or a combination thereof for rotating the rotor.

In any of the preceding embodiments, the sleeve, on its end away from the base, can comprise an inward annular protuberance. In one aspect, the inward annular protuberance secures the position of the rotor inside the sleeve along the axis of the sleeve.

In any of the preceding embodiments, the end surface of the sleeve away from the base can be flush with or higher than the end surface of the rotor away from the base.

In any of the preceding embodiments, the microfluidic valve can further comprise a cover plate connected to the sleeve. In any of the preceding embodiments, the cover plate, on its end surface toward the base, can comprise an annular groove to secure the position of the sleeve and the rotor along the axis of the sleeve.

In any of the preceding embodiments, the cover plate can further comprise an operating through-hole connected with the annular groove. In any of the preceding embodiments, the operating through-hole can expose the rotor to the outside environment of the microfluidic valve.

In any of the preceding embodiments, the microfluidic valve can comprise a plurality of sleeves. In any of the preceding embodiments, the microfluidic valve can comprise a plurality of annular grooves on the cover plate. In any of the preceding embodiments, each sleeve can correspond to an annular groove on the cover plate.

In any of the preceding embodiments, the microfluidic valve can comprise two apertures, e.g., two micropores. In any of the preceding embodiments, the microfluidic valve can comprise a first micro-column, a second micro-column, and a third micro-column. In any of the preceding embodiments, the first micro-column and the third micro column can be disposed on opposite sides of the rotor. In any of the preceding embodiments, the first micro-column and the third micro column can be configured to close or open or capable of closing or opening the two micropores simultaneously. In any of the preceding embodiments, the second micro-column can be configured to close or open or capable of closing or opening one of the two micropores individually while leaving the other micropore open or closed.

In any of the preceding embodiments, the end of the sleeve toward the base and the end of the micro-column toward the base can be at least partially embedded in the base. In any of the preceding embodiments, the base, on its surface toward the micro-column, can comprise an annular groove which is capable of engaging the micro-column. In any of the preceding embodiments, the end of the micro-column toward the base can be configured to slide or capable of sliding within the annular groove. In any of the preceding embodiments, a resilient gasket can be provided between the sleeve and the outside wall of the micro-column.

In any of the preceding embodiments, the aperture, e.g., the micropore, can be provided on the resilient gasket. In any of the preceding embodiments, the micropore can be provided between the connecting end surfaces of the sleeve and the base. In any of the preceding embodiments, the outside wall of the micro-column can be configured to block or close or capable of blocking or closing the micropore.

In any of the preceding embodiments, the aperture, e.g., the micropore, can be provided in the direction along the thickness of the base. In any of the preceding embodiments, the end surfaces of the micro-column away from the rotor can be configured to block or close or capable of blocking or closing the micropore.

In any of the preceding embodiments, the rotor, on the circumference of the end surface toward the base, can comprise a guiding sleeve. In any of the preceding embodiments, the guiding sleeve can rotate with the sleeve. In any of the preceding embodiments, the micro-structure (such as a micro-column) can be provided on the guiding sleeve.

In any of the preceding embodiments, the aperture, e.g., the micropore, can comprise a chamber. In any of the preceding embodiments, the micropore can comprise a microchannel. In any of the preceding embodiments, the first microchannel can be configured to communicate with the mixing chamber through the chamber.

In any of the preceding embodiments, the chamber can comprise a first section proximal to the mixing chamber and a second section distal to the mixing chamber.

In any of the preceding embodiments, the ratio of the diameters of the first section and the second section can be between about 1:3 and about 1:10.

In any of the preceding embodiments, the diameter of the aperture, e.g., the micropore, can be larger than about one percent of the diameter of the rotor. In any of the preceding embodiments, the diameter of the aperture, e.g., the micropore, can be smaller than about ½ of the diameter of the rotor.

In another aspect, provided herein is a microfluidic chip, comprising a chip body and one or more of the microfluidic valves according to any of the preceding embodiments.

In one aspect, provided herein is a microfluidic valve, comprising: a base; a sleeve disposed on the base; a rotor disposed within the sleeve, wherein the rotor, the sleeve, and the base form a mixing chamber; an aperture configured to communicate or capable of communicating with the mixing chamber; and a structure disposed on the rotor, wherein the structure is configured to block or close or capable of blocking or closing the communication between the aperture and the mixing chamber. In one embodiment, the aperture is or comprises an aperture, e.g., a micropore. In another embodiment, the base comprises an aperture, e.g., a micropore. In any of the preceding embodiments, the structure on the rotor can be or comprise a micro-column. In one embodiment, the micro-column comprises a feature for facilitating mixing or stirring of a substance inside the mixing chamber.

In any of the preceding embodiments, the rotor, on its end surface distal to the base, can comprise an interface structure for rotating the rotor. In one embodiment, the interface structure comprises a protuberance, a groove, or a combination thereof.

In any of the preceding embodiments, the sleeve, on its end distal to the base, can comprise an inward annular protuberance. In one embodiment, the inward annular protuberance secures the position of the rotor inside the sleeve along the axis of the sleeve.

In any of the preceding embodiments, the end surface of the sleeve distal to the base can be flush with or higher than the end surface of the rotor distal to the base.

In any of the preceding embodiments, the microfluidic valve can further comprise a cover plate fixed to or releasably connected to the sleeve. In one aspect, the cover plate, on its end surface proximal to the base, comprises an annular groove to secure the position of the sleeve and the rotor along the axis of the sleeve. In another aspect, the cover plate further comprises an operating through-hole connected with the annular groove, wherein operating through-hole is configured to expose or capable of exposing the rotor to the outside of the microfluidic valve. In any of the preceding embodiments, the microfluidic valve can comprise a plurality of annular grooves on the cover plate.

In any of the preceding embodiments, the microfluidic valve can comprise a plurality of sleeves. In one embodiment, each of the plurality of sleeves corresponds to an annular groove on the cover plate.

In any of the preceding embodiments, the microfluidic valve can comprise one or more apertures, such as two micropores. In any of the preceding embodiments, the microfluidic valve can comprise one or more structures on the rotor, such as three micro-columns, namely, a first micro-column, a second micro-column, and a third micro-column. In one embodiment, the first micro-column and the third micro column are disposed on opposite sides of the rotor. In one aspect, the first micro-column and the third micro column are configured to close or open or capable of closing or opening two micropores simultaneously. In another aspect, the second micro-column is configured to close or open or capable of closing or opening one of the micropores individually.

In any of the preceding embodiments, the end of the sleeve proximal to the base can be at least partially embedded in the base. In any of the preceding embodiments, the end of the structure on the rotor proximal to the base can be at least partially embedded in the base.

In any of the preceding embodiments, the base, on its surface proximal to the rotor, can comprise an annular groove capable of engaging the structure on the rotor. In any of the preceding embodiments, the end of the structure proximal to the base can be configured to be able to slide within the annular groove.

In any of the preceding embodiments, a resilient gasket can be provided between the sleeve and an outside wall of the structure on the rotor. In one embodiment, the aperture is provided on the resilient gasket. In one other embodiment, the aperture is provided between the connecting end surfaces of the sleeve and the base. In yet another embodiment, the aperture is provided on the resilient gasket and between the connecting end surfaces of the sleeve and the base. In some embodiments, the outside wall of the structure on the rotor is configured to block or close or capable of blocking or closing the aperture.

In any of the preceding embodiments, the aperture can be provided in the direction along the thickness of the base. In one aspect, the structure on the rotor has an end surface proximal to the base, and the end surface is configured to block or close or capable of blocking or closing the aperture.

In any of the preceding embodiments, the rotor, on the circumference of the end surface proximal to the base, can comprise a guiding sleeve. In one aspect, the guiding sleeve is configured to rotate or capable of rotating with the sleeve. In any of the preceding embodiments, the structure on the rotor can be provided on the guiding sleeve.

In any of the preceding embodiments, the aperture can comprise an aperture chamber and a channel. In one aspect, the channel is configured to communicate with the mixing chamber through the aperture chamber. In another aspect, the aperture chamber comprises a first section proximal to the mixing chamber and a second section distal to the mixing chamber. In still another aspect, the ratio of the diameters of the first section and the second section is between about 1:3 and about 1:10.

In any of the preceding embodiments, the diameter of the aperture can be larger than about one percent of the diameter of the rotor. In any of the preceding embodiments, the diameter of the aperture can be smaller than about ½ of the diameter of the rotor. In some embodiments, the diameter of the aperture is larger than about one percent and smaller than about ½ of the diameter of the rotor.

In any of the preceding embodiments, the mixing chamber can comprise substances to be mixed, one or more samples to be analyzed, and/or one or more reagents for a reaction.

In another aspect, provided herein is a microfluidic chip, comprising a chip body, and one or more of the microfluidic valve according to any of the preceding embodiments.

In still another aspect, provided herein is a system, comprising one or more of the microfluidic chip disclosed herein, and optionally a means for detecting a reaction in the microfluidic chip.

In another aspect, provided herein is a kit, comprising one or more of the microfluidic chip disclosed herein, and optionally one or more reagents for performing a reaction in the microfluidic chip, and/or one or more reagents for detecting a reaction in the microfluidic chip.

In yet another aspect, disclosed herein is a method, comprising: 1) turning the rotor to open the aperture of the microfluidic valve according to any of the preceding embodiments; 2) introducing a liquid in the mixing chamber via the aperture; and 3) turning the rotor to stir or agitate the liquid in the mixing chamber, e.g., to mix the substances in the liquid. In one embodiment, the present method further comprises discharging the liquid from the mixing chamber via the aperture. In one embodiment, the liquid is discharged by applying a centrifugal force to the microfluidic valve.

DETAILED DESCRIPTION

Figure 1:
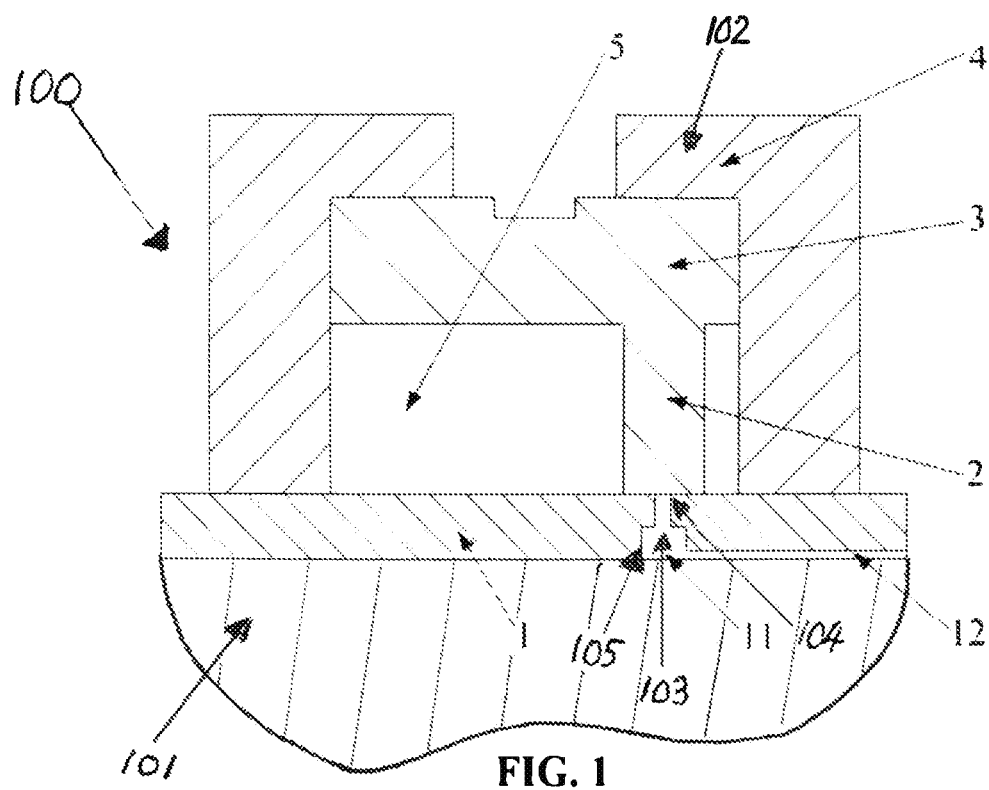
FIG. 1 is a vertical cross-sectional view of the microfluidic valve, e.g., a view from the front, according to one embodiment of the present disclosure. 1—base, 2—micro-column, 3—rotor, 4—sleeve, 5—mixing chamber, 11—micropore, and 12—micro-channel.

A detailed description of one or more embodiments of the claimed subject matter is provided below along with accompanying figures that illustrate the principles of the claimed subject matter. The claimed subject matter is described in connection with such embodiments, but is not limited to any particular embodiment. It is to be understood that the claimed subject matter may be embodied in various forms, and encompasses numerous alternatives, modifications and equivalents. Therefore, specific details disclosed herein are not to be interpreted as limiting, but rather as a basis for the claims and as a representative basis for teaching one skilled in the art to employ the claimed subject matter in virtually any appropriately detailed system, structure, or manner. Numerous specific details are set forth in the following description in order to provide a thorough understanding of the present disclosure. These details are provided for the purpose of example and the claimed subject matter may be practiced according to the claims without some or all of these specific details. It is to be understood that other embodiments can be used and structural changes can be made without departing from the scope of the claimed subject matter. It should be understood that the various features and functionality described in one or more of the individual embodiments are not limited in their applicability to the particular embodiment with which they are described. They instead can, be applied, alone or in some combination, to one or more of the other embodiments of the disclosure, whether or not such embodiments are described, and whether or not such features are presented as being a part of a described embodiment. For the purpose of clarity, technical material that is known in the technical fields related to the claimed subject matter has not been described in detail so that the claimed subject matter is not unnecessarily obscured.

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art. Many of the techniques and procedures described or referenced herein are well understood and commonly employed using conventional methodology by those skilled in the art.

All publications, including patent documents, scientific articles and databases, referred to in this application are incorporated by reference in their entireties for all purposes to the same extent as if each individual publication were individually incorporated by reference. If a definition set forth herein is contrary to or otherwise inconsistent with a definition set forth in the patents, patent applications, published applications or other publications that are herein incorporated by reference, the definition set forth herein prevails over the definition that is incorporated herein by reference. Citation of the publications or documents is not intended as an admission that any of them is pertinent prior art, nor does it constitute any admission as to the contents or date of these publications or documents.

All headings are for the convenience of the reader and should not be used to limit the meaning of the text that follows the heading, unless so specified.

Throughout this disclosure, various aspects of the claimed subject matter are presented in a range format. It should be understood that the description in range format is merely for convenience and brevity and should not be construed as an inflexible limitation on the scope of the claimed subject matter. Accordingly, the description of a range should be considered to have specifically disclosed all the possible sub-ranges as well as individual numerical values within that range. For example, where a range of values is provided, it is understood that each intervening value, between the upper and lower limit of that range and any other stated or intervening value in that stated range is encompassed within the claimed subject matter. The upper and lower limits of these smaller ranges may independently be included in the smaller ranges, and are also encompassed within the claimed subject matter, subject to any specifically excluded limit in the stated range. Where the stated range includes one or both of the limits, ranges excluding either or both of those included limits are also included in the claimed subject matter. This applies regardless of the breadth of the range.

A. Definitions

As used herein and in the appended claims, the singular forms "a," "an," and "the" include plural referents unless the context clearly dictates otherwise. For example, "a" or "an" means "at least one" or "one or more." Thus, reference to "a valve" refers to one or more valves, and reference to "the method" includes reference to equivalent steps and methods disclosed herein and/or known to those skilled in the art, and so forth.

As used herein, the term "microfluidic device" generally refers to a device through which materials, particularly fluid borne materials, such as liquids, can be transported, in some embodiments on a micro-scale, and in some embodiments on a nanoscale. Thus, the microfluidic devices described by the presently disclosed subject matter can comprise microscale features, nanoscale features, and combinations thereof. A microfluidic device can include a microfluidic valve, a microfluidic chip, a microfluidic system, etc.

Accordingly, an exemplary microfluidic device typically comprises structural or functional features dimensioned on the order of a millimeter-scale or less, which are capable of manipulating a fluid at a flow rate on the order of a µL/min or less. Typically, such features include, but are not limited to channels, fluid reservoirs, reaction chambers, mixing chambers, and separation regions. In some examples, the channels include at least one cross-sectional dimension that is in a range of from about 0.1 µm to about 500 µm. The use of dimensions on this order allows the incorporation of a greater number of channels in a smaller area, and utilizes smaller volumes of fluids.

A microfluidic device can exist alone or can be a part of a microfluidic system which, for example and without limitation, can include: pumps for introducing fluids, e.g., samples, reagents, buffers and the like, into the system and/or through the system; detection equipment or systems; data storage systems; and control systems for controlling fluid transport and/or direction within the device, monitoring and controlling environmental conditions to which fluids in the device are subjected, e.g., temperature, current, and the like.

As used herein, the terms "channel," "micro-channel," "fluidic channel," and "microfluidic channel" are used interchangeably and can mean a recess or cavity formed in a material by imparting a pattern from a patterned substrate into a material or by any suitable material removing technique, or can mean a recess or cavity in combination with any suitable fluid-conducting structure mounted in the recess or cavity, such as a tube, capillary, or the like. In the present disclosure, channel size means the cross-sectional area of the microfluidic channel. A microfluidic channel can include a channel in a microfluidic device in which a material, such as a fluid, e.g., a gas or a liquid, can flow through. A microfluidic channel can include a channel in which a material of interest, e.g., a solvent or a chemical reagent, can flow through. Further, the term "control channel" refers to a flow channel in which a material, such as a fluid, e.g., a gas or a liquid, can flow through in such a way to actuate a valve or pump.

As used herein, "chip" refers to a solid substrate with a plurality of one-, two- or three-dimensional micro structures or micro-scale structures on which certain processes, such as physical, chemical, biological, biophysical or biochemical processes, etc., can be carried out. The micro structures or micro-scale structures such as, channels and wells, electrode elements, electromagnetic elements, are incorporated into, fabricated on or otherwise attached to the substrate for facilitating physical, biophysical, biological, biochemical, chemical reactions or processes on the chip. The chip may be thin in one dimension and may have various shapes in other dimensions, for example, a rectangle, a circle, an ellipse, or other irregular shapes. The size of the major surface of chips of the present disclosure can vary considerably, e.g., from about 1 mm$^2$ to about 0.25 m$^2$. Preferably, the size of the chips is from about 4 mm$^2$ to about 25 cm$^2$ with a characteristic dimension from about 1 mm to about 5 cm. The chip surfaces may be flat, or not flat. The chips with non-flat surfaces may include channels or wells fabricated on the surfaces.

As used herein, a "sample" can be a solution, a suspension, liquid, powder, a paste, aqueous, non-aqueous or any combination thereof. A biological sample of the present disclosure encompasses a sample in the form of a solution, a suspension, a liquid, a powder, a paste, an aqueous sample, or a non-aqueous sample. As used herein, a "biological sample" includes any sample obtained from a living or viral (or prion) source or other source of macromolecules and biomolecules, and includes any cell type or tissue of a subject from which nucleic acid, protein and/or other macromolecule can be obtained. The biological sample can be a sample obtained directly from a biological source or a sample that is processed. For example, isolated nucleic acids that are amplified constitute a biological sample. Biological samples include, but are not limited to, body fluids, such as blood, plasma, serum, cerebrospinal fluid, synovial fluid, urine and sweat, tissue and organ samples from animals and plants and processed samples derived therefrom.

It is understood that aspects and embodiments of the present disclosure include "consisting" and/or "consisting essentially of" aspects and embodiments.

B. Microfluidic Valves, Chips, and Systems

In one aspect, the microfluidic valve of the present disclosure comprises a base, a sleeve, a rotatable rotor, and a micro-column, wherein: an aperture, e.g., a micropore, is provided in the base; the sleeve is disposed on the base; the rotatable rotor is disposed within the sleeve, located away from the end of the base; the rotatable rotor, the sleeve, and the base form a mixing chamber. In one aspect, the micropore is in communication with the mixing chamber. In another aspect, the micro-column is arranged in the rotor and located in the mixing chamber, and the micropores can be closed by the micro-column.

By rotating the rotor to close the aperture(s), e.g., the micropore(s), with the micro-column(s), the fluid passage can be cut off. Then, by rotating the rotor to take the micro-column(s) away from the micropore(s), the micropore(s) can become open in order to connect the micropore(s) with the mixing chamber. Thus, the fluid passage is open. During the rotation of the rotor, the micro-column(s) can also rotate in the mixing chamber in order to mix and/or stir the liquid.

In one aspect, the present disclosure provides a microfluidic valve which, through the rotation of the rotor, can realize not only the on/off control of the aperture(s), e.g., the micropore(s), provided on the base, but also the mixing and agitating of the liquid in the mixing chamber. In the present disclosure, there is also provided a microfluidic valve with a stirring function, thus reducing the number of components installed on the microfluidic chip for easy assembly. The present disclosure also provides a microfluidic chip, the chip includes a chip body and microfluidic valves disposed on the body, wherein the microfluidic valve is according to any of the embodiments disclosed herein.

In some aspects, provided herein is a valve as shown in any of FIGS. 1-16. Each drawing is provided as an example for illustrating one or more aspects of the present disclosure, and should not be used to limit the scope of the claimed subject matter. Other features, details, utilities, and advantages of the claimed subject matter will be apparent from the detailed description and in the appended claims.

In one embodiment, disclosed herein is a valve, such as a microfluidic valve, as shown in FIG. 1. In one aspect, the valve comprises a base, a sleeve, a rotor, and a micro-structure such as a micro-column. As shown in FIG. 1, sleeve 4 can be disposed on base 1. The sleeve and the base can be manufactured as one piece, or as separate pieces and then bonded together in order to function within the same valve. In one aspect, the base comprises a micro-aperture, such as a micropore, which can be connected to one or more channels. In FIG. 1, micropore 11 is connected to micro-channel 12. In one embodiment, the rotor is disposed within the sleeve and located, for example, distal to the base. In FIG. 1, rotor 3 is rotatable within sleeve 4 and provided at one end of the sleeve pointing away from base 1. In one aspect, the rotor, the sleeve and the base together form a mixing chamber. For example, in FIG. 1, mixing chamber 5 is formed by rotor 3, sleeve 4, and base 1. In one aspect, the micro-aperture on the base can be in communication with the mixing chamber when the micro-structure is not blocking the micro-aperture and the valve is in the open configuration. In one embodiment, the mixing chamber contains a liquid and the micro-aperture on the base can be in fluidic communication with the mixing chamber when the micro-structure is not blocking the micro-aperture and the valve is in the open configuration. In certain aspects, the micro-structure can be provided on the rotor, directly or indirectly, or can be coupled to the rotor such that the movement of the micro-structure within the sleeve is actuated by the rotation of the rotor. In one embodiment, the micro-structure, such as micro-column 2 as shown in FIG. 1, is capable of both mixing a liquid within the mixing chamber and blocking the micro-aperture on the base. In one aspect, the micro-structure and the rotor are constructed as one-piece to facilitate manufacture, device assembly, and/or assay processing. In another aspect, the micro-structure and the rotor are separately manufactured (such as by molding) and then the micro-structure can be permanently or releasably mounted to the rotor.

In one aspect, as shown in FIG. 1, rotor 3 is actuated to rotate to a position such that micro-structure 2 closes micro-aperture 11 to cut off fluid flow and/or fluidic communication between micro-aperture 11 (and channel 12) and mixing chamber 5. In another aspect, rotor 3 rotates to another position, moving micro-structure 2 away from micro-aperture 11 and allowing fluid flow and/or fluidic communication between micro-aperture 11 (and channel 12) and mixing chamber 5. In one aspect, during the rotation of rotor 3, micro-structure 2 also moves and/or rotates in mixing chamber 5 in order to mix and/or stir the liquid.

In one aspect, provided herein is a microfluidic valve which, through the rotation of the rotor, not only can control the on/off of the fluidic flow and/or fluidic communication through the micro-aperture provided on the base, but also can mix and/or agitate the liquid in the mixing chamber. Therefore, the microfluidic valve achieves both functions, namely, on-off of flow path and stirring of the fluid, so as to reduce the number of parts provided in a micro-fluidic chip and facilitate assembly of the chip and a system comprising the valve or chip.

Figure 5:
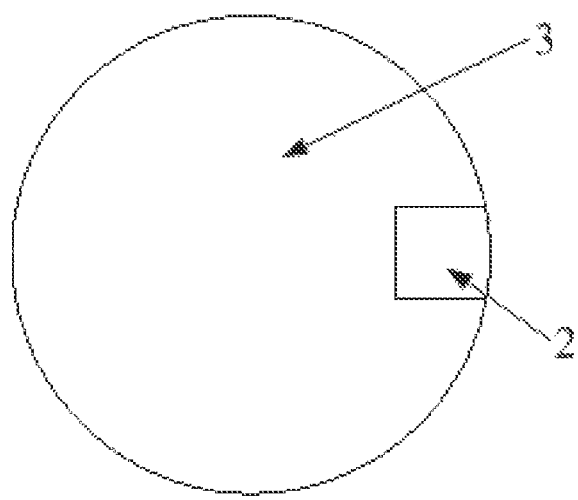
FIG. 5 is a horizontal cross-sectional view of a rotor and a micro-column of the microfluidic valve, e.g., a view from the bottom or top, according to one embodiment of the present disclosure. 2—micro-column, and 3—rotor.

In another aspect, the microfluidic valve disclosed herein can carry a certain amount of liquid, and/or achieve the function of fully mixing a sample and a reagent, multiple different reagents, or multiple different samples, for example, within mixing chamber 5 as shown in FIG. 5. Therefore, in one aspect, the microfluidic valve disclosed herein controls fluidic flow, mixing of samples and/or reagents, initiates and/or facilitates reactions, etc. In one aspect, the multitude of functions can be achieved simultaneously, without the need of additional parts, using the microfluidic valve disclosed herein. Thus, the functionality of the microfluidic valve disclosed herein is multifaceted.

In one aspect, in order to facilitate the rotation of rotor 3, interface structure 32 is provided on the surface of the rotor distal to the base, e.g., on the upper surface of the rotor as shown in FIGS. 12-15. In some embodiments, the interface structure comprises a protuberance, a groove, or a combination thereof, on a surface of the rotor. The interface structure may be directly or indirectly connected to a means for actuating the rotor, such as a motor. In one aspect, through the interface structure on the upper surface of the rotor, an external force is used to rotate the rotor, which in turn actuates the micro-structure on the lower surface of the rotor in order to stir and/or mix the liquid in the mixing chamber.

The interface structure can be of any suitable shape or size. In particular embodiments, the interface structure comprises a bump, a groove, or a combination thereof. For example, the bump or groove can be line-shaped, cross-shaped, T-shaped, triangular shape, as shown in FIGS. 12-15. The specific shape and size can be designed and/or adjusted, depending on the external actuating means or unit that engages and/or actuates the rotor. For example, rotor 3 can be manually rotated by a screw or automatically rotated by a control unit within a microfluidic device, in order to mix or stir the liquid within mixing chamber 5 as well as open or close the micro-aperture for liquid flow or transfer.

In other embodiments, an interface structure is not provided on the rotor or any other part of the microfluidic valve in order to actuate the rotor. Instead, the rotor can be actuated by an external force that does not require physical contact, a magnetic force or an electromagnetic force. For instance, when the rotor comprises a metal, the rotor can be driven by a magnet or a metal coil (provided with an alternating current in order to generate an electromagnetic field of the coil).

In some embodiments, a microfluidic valve, chip or device of the present disclosure comprises a means for actuating the rotor, such as a rotary cylinder.

In one embodiment, the sleeve comprises an inward annular protrusion at an end distal to the base, for positioning of and/or securing the rotor within the sleeve. In one aspect, the inward annular protrusion positions the rotor within the sleeve along its axis. For example, as shown in FIG. 1, the inward annular protrusion shares a common axis with rotor 3. In other embodiments, the inward annular protrusion, rotor 3, and sleeve 4 all share a common axis. In one aspect, when rotor 3 and the annular locating protrusion are positioned coaxially, the hole formed by the inward annular protrusion (in the center at the end of the sleeve distal to the base) is smaller than the area of the upper surface of rotor 3. Thus, in one aspect an area of the upper surface of rotor 3 is exposed to achieve the rotation of rotor 3, for example, through an interface structure on that exposed area of the upper surface. In other embodiments, instead of using the annular protrusion for holding the rotor in position, the rotor can be embedded in the inner wall of the sleeve so that the rotor can rotate within the sleeve on a horizontal plane while maintaining its relative position to the sleeve on the vertical axis.

Figure 2:
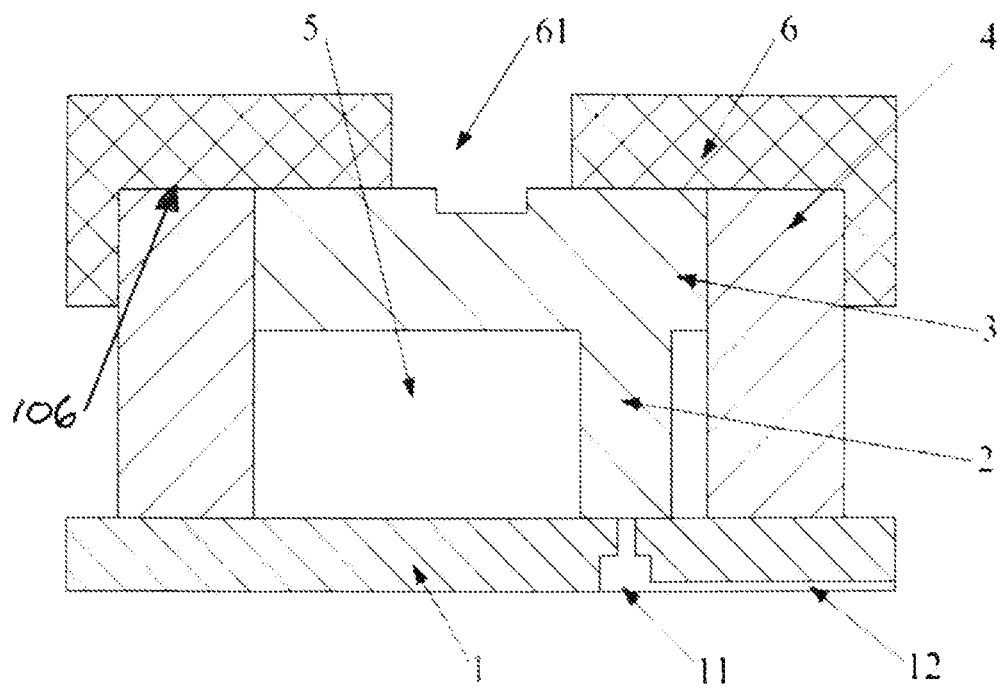
FIG. 2 is a vertical cross-sectional view of the microfluidic valve, e.g., a view from the front, according to one embodiment of the present disclosure. 1—base, 2—micro-column, 3—rotor, 4—sleeve, 5—mixing chamber, 6—cover plate, 11—micropore, 12—micro-channel, and 61—operating through-hole.
Figure 3:
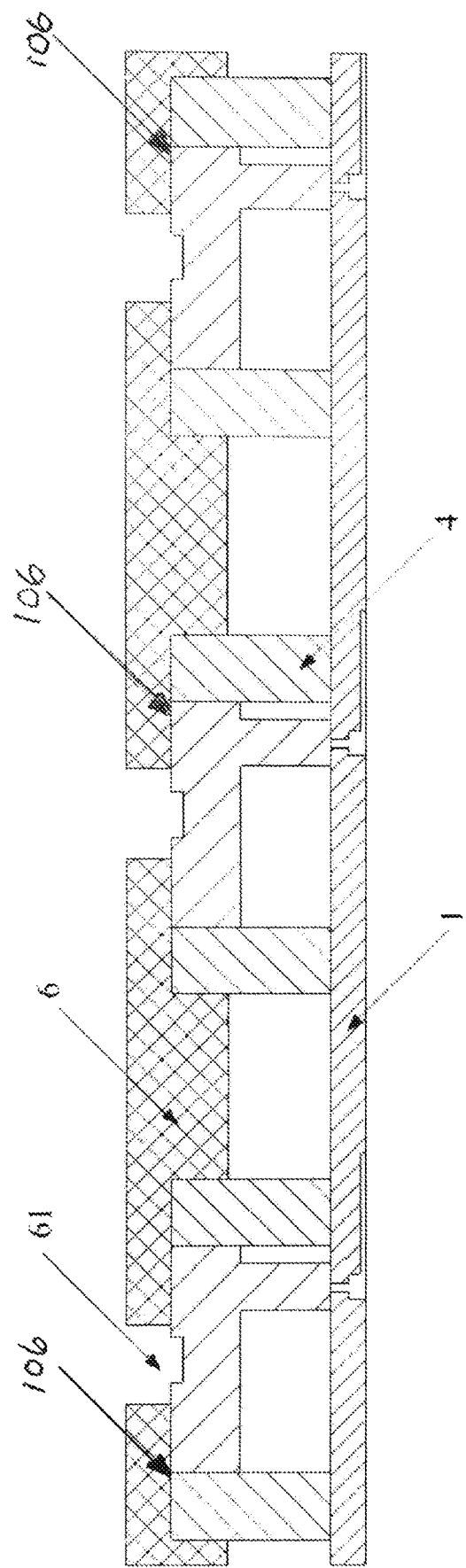
FIG. 3 is a vertical cross-sectional view of the microfluidic valve, e.g., a view from the front, according to one embodiment of the present disclosure. 1—base, 4—sleeve, 6—cover plate, and 61—operating through-hole.

In another aspect, both the sleeve and the rotor have a surface on an end that is distal to the base. In one embodiment, the surface of the sleeve and the surface of the rotor are on the same level. For example, as shown in FIGS. 2 and 3, the end surface of sleeve 4 away from base 1 is on the same level as the end surface of rotor 3 away from base 1. In other embodiments, the end surface of sleeve 4 away from base 1 is higher than the end surface of rotor 3 away from base 1.

In a further embodiment, the microfluidic valve further comprises a cover plate fixed or mounted to the sleeve. For example, there is provided a structure on cover plate 6 and/or sleeve 4 for axially keeping the sleeve and the rotor in place. As shown in FIG. 2, an annular groove is provided on cover plate 6, on the surface facing base 1, in order to accommodate sleeve 4 and/or rotor 3. In another embodiment, the cover plate comprises one or more operating through-holes, to allow access to the upper surface of the rotor. In some embodiments, the operating through-hole is in connection with the annular groove. As shown in FIG. 2, operating through-hole 61 is provided on cover plate 6 to expose rotor 3, and is connected to the annular groove of the cover plate. Therefore, in one embodiment, cover plate 6 functions to fix rotor 3 and sleeve 4 in place along the vertical axis. In one aspect, the sleeve is of a straight cylindrical shape, which that is convenient for manufacture and processing.

In the present disclosure, the material of the rotor can be a hard material. In some embodiments, the rotor comprises a material selected from the group consisting of plastics, metals, and composite materials. In another aspect, the rotor comprises a flexible material, such as rubber, silica gel, PDMS (polydimethylsiloxane, polydimethyl siloxane), etc. In yet another aspect, the rotor comprises a combination of a hard material and a flexible material.

In one aspect, the materials of the rotor, the sleeve, the base, and the cover plate may comprise a hydrophilic material and/or a hydrophobic material, in order to reduce spillage of liquid during the mixing process. In some embodiments, the materials comprise a hydrophobic material or a material that is surface treated to be hydrophobic.

In order to meet the needs of a variety of functions required of a microfluidic chip, in some embodiments, the cover plate comprises a plurality of annular grooves, each of which is configured to accommodate the sleeve of a microfluidic valve of the present disclosure. The plurality of microfluidic valves connected to the cover plate of the same microfluidic chip can be of the same design or different designs. As shown in FIG. 3, each of the plurality of sleeves 4 can be flush with the corresponding rotor 3, and the sleeves are fixed by the same cover plate 6. In this configuration, the plurality of sleeves 4 can share the same base 1—this structure is simple and easy to manufacture. Each sleeve 4, together with its corresponding rotor 3, may form the same mixing chamber 5 (among the plurality of microfluidic valves) or different mixing chambers 5. The mixing chambers 5 can be of different shapes, different volumes, different materials, different inner surface treatment, etc., in order to adapt to the needs of a variety of samples and/or reagents. For example, different microfluidic valves may be provided on the same base of the same microfluidic chip, but for reacting with different reagents and/or detecting different samples or target molecules. Thus, on the same chip, various functionalities can be achieved in different mixing chambers of the microfluidic valves. In another embodiment, only one sleeve 4 may be provided, and only one annular groove is provided on cover plate 6.

Figure 6:
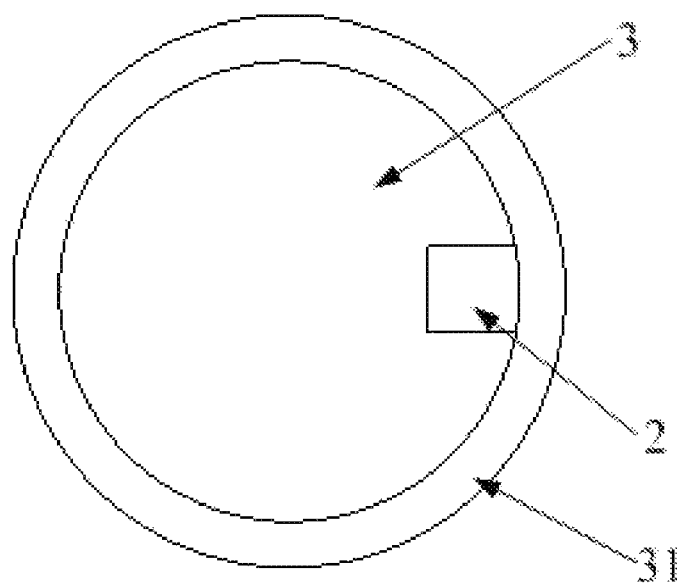
FIG. 6 is a horizontal cross-sectional view of a rotor and a micro-column of the microfluidic valve, e.g., a view from the bottom or top, according to one embodiment of the present disclosure. 2—micro-column, 3—rotor, and 31—guiding sleeve.
Figure 7:
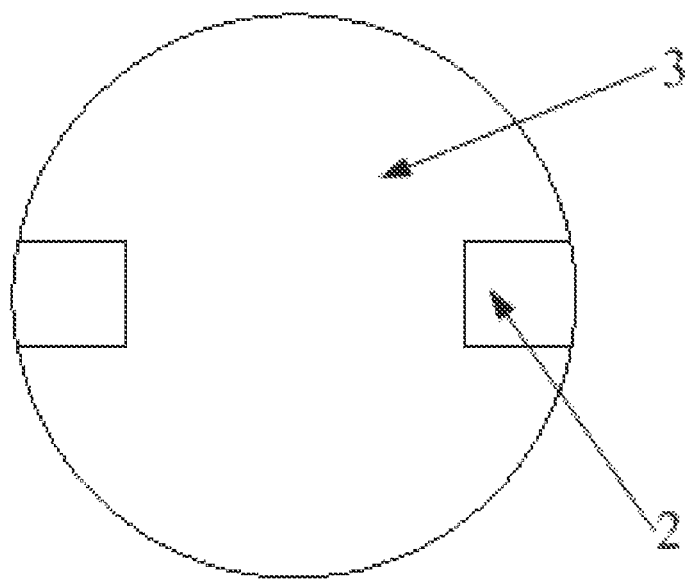
FIG. 7 is a horizontal cross-sectional view of a rotor and a micro-column of the microfluidic valve, e.g., a view from the bottom or top, according to one embodiment of the present disclosure. 2—micro-column, and 3—rotor.
Figure 8:
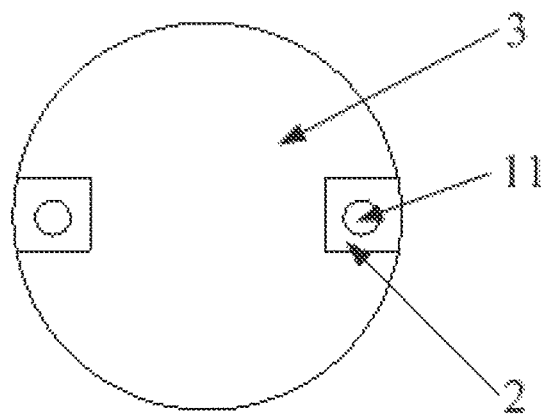
FIG. 8 is a horizontal cross-sectional view of a micro-aperture and a micro-column of the microfluidic valve, e.g., a view from the bottom or top, according to one embodiment of the present disclosure. This figure shows the relative position between the micro-aperture and the micro-column. 2—micro-column, 3—rotor, and 11—micropore.

Any suitable coordination mode between the micro-aperture(s) on the base and the micro-structure(s) on the rotor can be used, in order to achieve the need to turn on/off any number of flow path(s). In one aspect, one or a plurality of micro columns 2 may be provided for each rotor 3. As shown in FIGS. 5-7, the micro-structure(s), e.g., micro column(s) 2, can be arranged on a rotor in a variety of arrangements to suit the specific need of an assay. A user of the microfluidic valve or chip of the present disclosure can turn on or off the flow channel(s) in accordance with the various arrangements.

In one example, as shown in FIG. 5, there is one micro-aperture on the base and one micro-column on the rotor. When micro-column 2 is rotated to a position in which the micro-column does not completely cover or block the micro-aperture, fluid can be introduced into the micro-aperture by pipetting. In this configuration, fluid in the mixing chamber can also be discharged, for example, when a centrifugal force is applied to the microfluidic valve.

Figure 9:
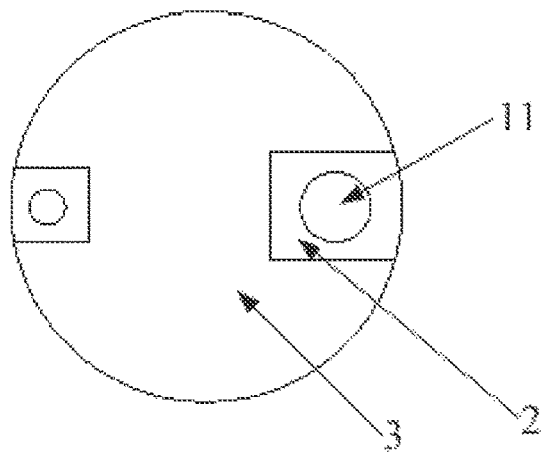
FIG. 9 is a horizontal cross-sectional view of a micro-aperture and a micro-column of the microfluidic valve, e.g., a view from the bottom or top, according to one embodiment of the present disclosure. This figure shows the relative position between the micro-aperture and the micro-column. 2—micro-column, 3—rotor, and 11—micropore.
Figure 10:
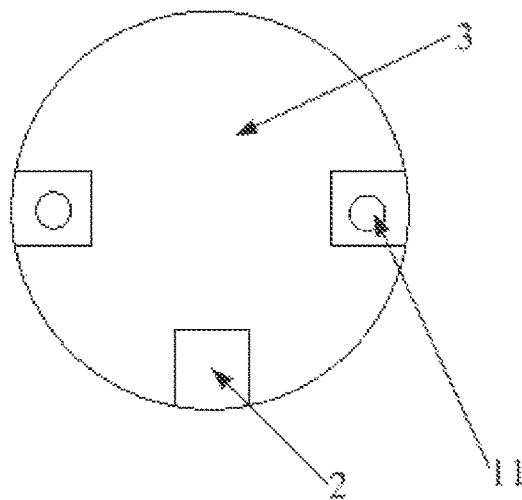
FIG. 10 is a horizontal cross-sectional view of a micro-aperture and a micro-column of the microfluidic valve, e.g., a view from the bottom or top, according to one embodiment of the present disclosure. This figure shows the relative position between the micro-aperture and the micro-column. 2—micro-column, 3—rotor, and 11—micropore.

As shown in FIGS. 9-10, the cross-sectional area of each of micro-columns 2 of the same rotor 3 may be the same or different in size, shape, material, and/or surface treatment. In some embodiments, the base may comprise one or more micro-apertures. The micro-apertures may be connected to the same or different micro-channels. The micro-apertures may be different in size and/or shape, and each micro-structure on the rotor may be designed to correspond to each of the micro-apertures, such that each micro-structure is capable of blocking its corresponding micro-aperture when the rotor moves the micro-structure to above the corresponding micro-aperture. In some embodiments, the shape of the micro-aperture and/or the cross-section of the micro-structure can be round, square, rectangular, triangular, oval, pentagonal, hexagonal, octagonal, or decagonal, or of any other suitable shape. In some embodiments, the micro-structures of a rotor can be the same or different shape or size. For example, the micro-structures can be a circular cylinder, a cylindrical sector, or a rectangular cylinder, or any other suitable shape. In some embodiments, the micro-structure comprises one or more stirring blades for effectively mixing and stirring the liquid within the mixing chamber.

In one embodiment, the microfluidic valve comprises two micro-apertures on the base and two micro-columns on the rotor. As shown in FIG. 9, the size and shape of the two micro-apertures may be the same or different. In one aspect, the size and shape of the two corresponding micro-columns can also be the same or different. In one example, two fluids are to be mixed, for example, for a reaction to occur in the mixing chamber. Each fluid can be introduced into the mixing chamber via a micro-aperture on the base of the microfluidic valve. Depending on the property of each of the two fluids, the two micro-apertures can differ in size and/or shape. Accordingly, the size and/or shape of the two micro-columns can also be different. In one aspect, two micropores 11 can be turned on or off simultaneously by two micro-columns 2. In another aspect, it is possible to open or close only one of the two micropores. In one embodiment, two kinds of fluids may be added to mixing chamber 5 at the same time to realize the mixture of the two fluids. In another embodiment, a sample is first placed in mixing chamber 5, and two kinds of fluids are then introduced into the mixing chamber, each via a micropore on the base, and the two fluids can be mixed with the sample, for example, for one or more reactions to occur. The two kinds of fluids can be added simultaneously, or sequentially. Accordingly, the fluids can react with the sample simultaneously. Alternatively, one fluid is first added to react with the sample, and then the other fluid is added to the reaction mixture for a further reaction. After completion of the reaction(s) or the mixing of samples and/or reagents, the mixture can be discharged from mixing chamber 5—for example, one micropore is open and the other remains closed, and then a centrifugal force is applied on the microfluidic valve to discharge the liquid mixture from mixing chamber 5.

Figure 11:
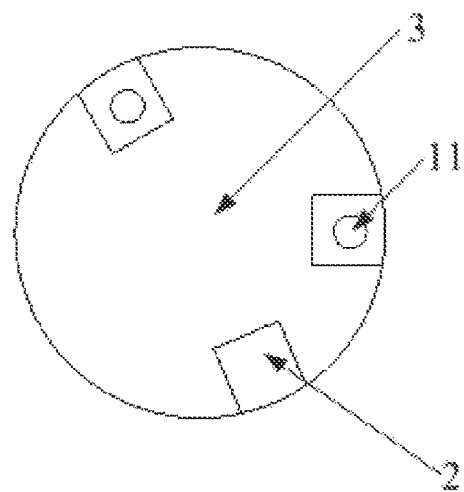
FIG. 11 is a horizontal cross-sectional view of a micro-aperture and a micro-column of the microfluidic valve, e.g., a view from the bottom or top, according to one embodiment of the present disclosure. This figure shows the relative position between the micro-aperture and the micro-column. 2—micro-column, 3—rotor, and 11—micropore.
Figure 12:
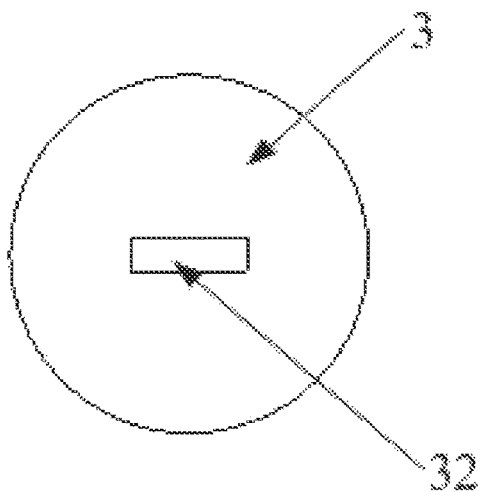
FIG. 12 shows an interface structure of a rotor of the microfluidic valve according to one embodiment of the present disclosure. 3—rotor, and 32—interface structure.
Figure 13:
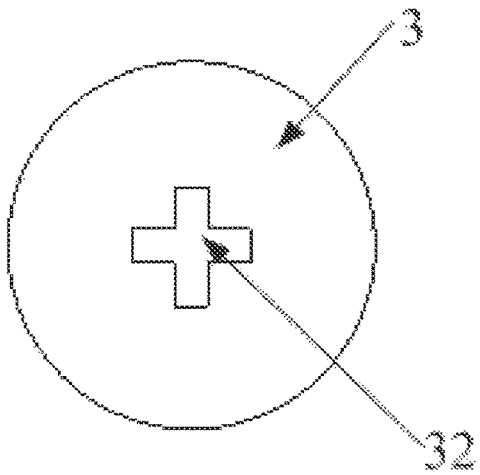
FIG. 13 shows an interface structure of a rotor of the microfluidic valve according to one embodiment of the present disclosure. 3—rotor, and 32—interface structure.
Figure 14:
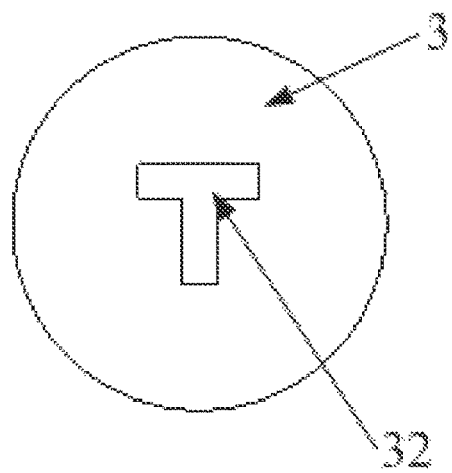
FIG. 14 shows an interface structure of a rotor of the microfluidic valve according to one embodiment of the present disclosure. 3—rotor, and 32—interface structure.
Figure 15:
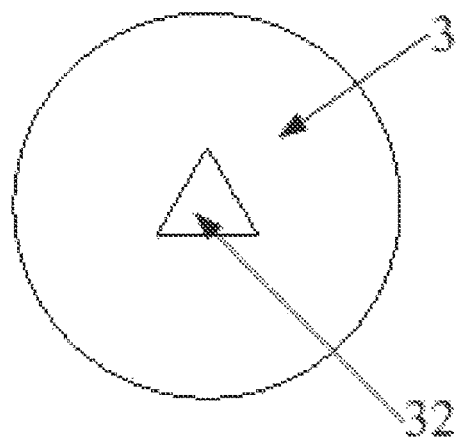
FIG. 15 shows an interface structure of a rotor of the microfluidic valve according to one embodiment of the present disclosure. 3—rotor, and 32—interface structure.

In one embodiment, there are two micropores on the base. For example, as shown in FIG. 10, the two micropores can be collinear with the center of the rotor. In one aspect, the two micropores are provided on opposite side of the base. In one aspect, the two micropores are located on the same line on base 1, and the line intersects with the vertical axis of rotor 3. In another aspect, the two micropores are arranged in a manner as shown in FIG. 11.

In one embodiment, there are three micro-columns, namely, the first micro-column, the second micro-column, and the third micro-column. In one aspect, the first and third micro-columns and the center of the base are on the same line. For example, as shown in FIG. 10, the first and third micro-columns are collinear, on the same line on base 1 that intersects with the vertical axis of rotor 3. In this configuration, the first and third micro-columns can close or open the two micropores simultaneously, while either one of the two micropores can be closed or opened individually by the second micro-column. In order to introduce one or more liquids into mixing chamber 5, each of the three micro-columns is placed at a position away from both micropores, such that both micropores are open. Then, the same reagent and/or sample or different reagents and/or samples can be introduced into mixing chamber 5 via the two micropores. The rotor can then be rotated to move the three micro-columns in order to mix the fluid(s), sample(s), and/or reagent(s) in mixing chamber 5. In some aspects, the mixing initiates and/or facilitates one or more reactions within the mixing chamber. In one aspect, the second micro-column is then rotated to block one of the two micropores, while the first and second micro-columns are located at positions away from the other micropore. Thus, the other micropore remains open, and the mixture in mixing chamber 5 can be discharged from the open micropore, for example, via application of a centrifugal force to the microvalve.

Figure 4:
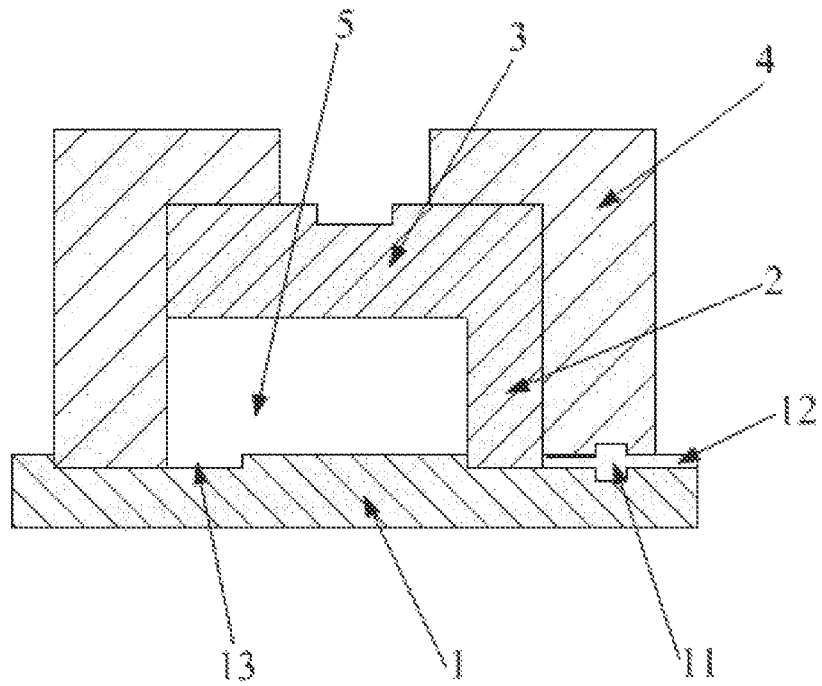
FIG. 4 is a vertical cross-sectional view of the microfluidic valve, e.g., a view from the front, according to one embodiment of the present disclosure. 1—base, 2—micro-column, 3—rotor, 4—sleeve, 5—mixing chamber, 11—micropore, 12—micro-channel, and 13—annular groove.

In one embodiment, the end of sleeve 4 that is proximal to base 1 engages the base. In one aspect, the engagement fixes the relative position of the sleeve to the base. In another aspect, the end of the sleeve sealingly engages the base so as to prevent leakage of liquid from the mixing chamber. For example, the tip of the end of sleeve 4 can be embedded in, anchored to, bonded to, or inserted into a recess on the base. In one embodiment, the end of micro-structure 2 that is proximal to base 1 engages the base. In one aspect, the engagement fixes the relative position of the sleeve to the base in the vertical direction, but allows movement of the micro-structure on a horizontal plane in order to mix the contents in the mixing chamber. In another aspect, the end of the micro-structure is inserted into and/or fittingly engages a recess on the base. In any of the preceding embodiments, the recess on the base can comprise an annular groove, for example, annular groove 13 as shown in FIG. 4. In one aspect, on the surface of the base facing the micro-structure, there is provided an annular groove. For example, annular groove 13 cooperates with the sliding of micro-column 2 to facilitate movement of the micro-column within mixing chamber 5. In one aspect, when the rotor is rotated, the micro-column slides along the annular groove. In one aspect, as shown in FIG. 4, micro-column 2 sealingly fits with annular groove 13 and sleeve 4, such that when micro-column slides along annular groove 13, it also matches or seals with sleeve 4. In one embodiment, sleeve 4 is connected to (e.g., bonded to) base 1 through the bottom end surface of the sleeve and a side surface of the sleeve, as shown in FIG. 4. This increases the contact area between the sleeve and the base and the strength of connection, so as to improve the sealing performance of mixing chamber 5. In another embodiment, part of sleeve 4 and/or micro-column 2 is not embedded in base 1, and instead the sleeve and/or micro-column sealingly contact the upper surface of the base.

In one aspect, in order to further increase the sealing performance of mixing chamber 5, a gasket (not shown in the drawings) is provided between sleeve 4 and the outside wall of micro-column 2. In one aspect, the gasket is a resilient gasket. In one aspect, the outer wall of micro-column 2 is flush with the outer side wall of rotor 3. The resilient gasket and the inner surface of sleeve 4 can be mounted to each other by hot pressing, gluing, laser welding, ultrasonic welding, screwing, molding as one piece, fixed integrally injection molding, etc. In one embodiment, the resilient gasket can also be directly sandwiched with no treatment between sleeve 4 and micro-column 2.

In one embodiment, as shown in FIG. 4, one or more micropores 11 are provided between sleeve 4 and base 1, for example, between the surface of sleeve 4 and the surface of base 1 that contact each other. In one aspect, the sleeve and the base form a tight seal except at the micropore(s), such that liquid can introduced into and/or discharged from the mixing chamber only from the micropore(s) and not from any other interface between the base and the sleeve. In one aspect, the micropore or micropores are arranged between the connecting surfaces of the sleeve and the base, and through the resilient gasket if one is used between the sleeve and the micro-column. In one aspect, the micropores can be closed by the outer wall of micro-column 2, when the micro-column is rotated to a position that its outer wall blocks the micropore(s). In one aspect, this ensures the reliability of blocking of the micropore(s) by micro-column 2 and improves the sealing performance of mixing chamber 5. In one embodiment, as shown in FIG. 4, the opening of the micropore(s) faces the outer surface of the micro-column, as compared to facing the bottom surface of the micro-column as shown in FIGS. 1-3. In one aspect, the micropore is formed between a first recess on the surface of the sleeve facing the base, and a second recess on the surface of the base facing the sleeve. For example, as shown in FIG. 4, the micropore is formed between a first recess on the bottom surface of sleeve 4 and a second recess on the upper surface of base 1. In one aspect, the outer surface of the micro-column is capable of blocking the micropore(s), and rotation of the micro-column can be used to control the closing and opening of the micropore(s).

In one aspect, the rotor can be mounted to the inside of the sleeve by a gasket or washer, such as a resilient gasket or washer. In one aspect, a resilient washer is used to fix rotor 3 in sleeve 4. The elastic washer may be made of silica gel, PDMS, or a rubber-like material. In some embodiments, the gasket or washer can be secured directly to and/or embedded within sleeve 4. The elastic washer and the inner surface of sleeve 4 can be connected to each other by hot pressing, gluing, laser welding, ultrasonic welding, screwing, molding, or integral molding by injection. In some embodiments, the over plate and the sleeve can be connected to each other by hot pressing, gluing, laser welding, ultrasonic welding, screwing, molding, or integral molding by injection. In other embodiments, the sleeve and the base can be connected to each other by hot pressing, gluing, laser welding, ultrasonic welding, screwing, molding, or integral molding by injection.

In any of the preceding embodiments, the micropore can be provided in the direction along the thickness of the base, such that the micropores can be closed by the end surfaces of the micro-column that are distal to the rotor. As shown in FIG. 1, a micropore is provided along the base 1 in the direction of its thickness. The end surface of micro-column 2 away from rotor 3 (i.e., the bottom surface of micro-column 3, as shown in FIG. 1) can block the opening of micropore 11, so that the micropore can be closed off. In one aspect, the cross-sectional area of micro-column 2 is larger than the cross-sectional area of the opening of micropore 11. In another aspect, micro-column 2 and base 1 form an even and smooth interface around the opening of micropore 11, in order to provide good sealing and prevent leakage of liquid when the microvalve is in the "off" mode for that micropore. In one aspect, the base with the micropore(s) is easy to manufacture.

In one aspect, the bottom surface of rotor 3 may comprise just one or more micro-structures such as micro-columns 2. An example of such a configuration is shown in FIG. 5, which shows a cross-sectional view of rotor 3 and micro-column 2. In this configuration, micro-column 2 is provided along the outer periphery of the rotor. In other embodiments, micro-column 2 can be provided internally, so that it does not share an outer periphery with the rotor, for example, as shown in FIG. 1. In other embodiments, the micro-structure comprises a micro-column (such as a micro-cylinder), a thin side wall, and/or a blade structure to improve mixing. In one aspect, the micro-structure itself is in the form of a thin wall or blade which can be used to improve the efficiency of stirring and mixing.

In one aspect, the rotor comprises a guide protuberance on its end facing the base. For example, as shown in FIG. 6, rotor 3 on its external periphery closer to base 1 comprises a guide cylinder or tube (or guiding sleeve) 31 having an end face in the form of guide protuberance or protrusion. In one aspect, guide cylinder 31 rotatably engages sleeve 4, and micro-column 2 is provided within guide cylinder 31. In this example, the contents of mixing chamber 5 make contact with the guide cylinder 31, instead of contacting the inner surface of sleeve 4 directly. In one aspect, this configuration achieves better seal to prevent leakage.

In another aspect, the micro-aperture comprises an aperture chamber. The aperture chamber is optionally capable of forming fluidic connection with one or more channels. For example, as shown in FIG. 1, micro-aperture 11 comprises an aperture chamber connected to micro-channel 12. Thus, micro-aperture 11 connects micro-channel 12 to mixing chamber 5. The aperture chamber can comprise a first section and a second section, the first section being closer to the mixing chamber. In some embodiments, the diameter of the first section (section closer to the mixing chamber) is greater than the diameter of the second section (section distal to the mixing chamber). In particular embodiments, the ratio of the diameters of the first and second sections of the aperture chamber is about 1:3, about 1:4, about 1:5, about 1:6, about 1:7, about 1:8, about 1:9, about 1:10, about 1:11, about 1:12, about 1:13, about 1:14, about 1:15, about 1:16, about 1:17, about 1:18, about 1:19, about 1:20, about 1:21, about 1:22, about 1:23, about 1:24, about 1:25, about 1:26, about 1:27, about 1:28, about 1:29, or about 1:30. In particular embodiments, the ratio of the diameters of the first and second sections of the aperture chamber is between about 1:1.5 and about 1:50. This way, because the cross-sectional area of the section closer to the mixing chamber is smaller than the cross-sectional area of the distal section, accidental liquid spills or leakage can be prevented and/or reduced when the micro-aperture is open. The accidental liquid spills or leakage can be prevented from mixing chamber and/or from the micro-aperture. In other words, the configuration of the first and second sections of the aperture chamber can prevent spills and leakage from the mixing chamber to the micro-aperture, or from the micro-aperture to the mixing chamber.

As shown in FIG. 1, FIG. 2, FIG. 4, and FIG. 16, micro-channel 12 is provided in the microfluidic valve to, in cooperation with micro-aperture 11, to allow liquid flow in either direct. In some embodiments, micro-channel 12 facilitates the introduction of liquid into mixing chamber 5 and/or the discharge of liquid from mixing chamber 5. The micro-aperture may be in any suitable shape, for example, a conically tapered bore. In some embodiments, the microfluidic valve does not comprise a micro-channel, and only comprises the aperture chamber. In other embodiments, the micro-aperture may be a cylindrical hole with a constant diameter along its axis.

In some embodiments, the ratio between the diameter of the micro-aperture and the diameter of the rotor is greater than about 1:100. In some embodiments, the ratio between the diameter of the micro-aperture and the diameter of the rotor is smaller than about 1:2. For example, the ratio between the diameter of the micro-aperture and the diameter of the rotor can be about 1:90, about 1:80, about 1:70, about 1:60, about 1:50, about 1:40, about 1:30, about 1:20, about 1:10, or about 1:5. In some embodiments, the ratio between the diameter of the micro-aperture and the diameter of the rotor is between about 1:100 and about 1:500.

In some embodiments, the diameter of the rotor is between about 0.3 cm and about 3 cm. In some embodiments, the diameter of the rotor is about 0.1, about 0.2, about 0.3, about 0.4, about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.6, about 2.7, about 2.8, about 2.9, about 3.0, about 4.0, about 5.0 cm, or more than about 5.0 cm.

In some embodiments, the diameter of the micro-aperture is between about 0.003 cm and about 0.6 cm. In some embodiments, the diameter of the micro-aperture is about 0.0005, about 0.001, about 0.002, about 0.003, about 0.004, about 0.005, about 0.006, about 0.007, about 0.008, about 0.009, about 0.01, about 0.02, about 0.03, about 0.04, about 0.05, about 0.06, about 0.07, about 0.08, about 0.09, about 0.1, about 0.2, about 0.3, about 0.4, about 0.5, about 0.6, about 0.7, about 0.8, about 0.9, or about 1.0 cm, or greater than about 1.0 cm.

In any of the preceding embodiments, the micro-aperture is of a suitable size relative to the size of the mixing chamber, in order to ensure optimal passage of a liquid either when it is introduced into or discharged from the mixing chamber, and in another aspect, to prevent or reduce leakage of liquid during mixing or stirring within the mixing chamber.

Also provided herein is a microfluidic chip comprising one or more of the microfluidic valve according to any of the preceding embodiments. In one aspect, the microfluidic chip comprises a chip body and one or more microfluidic valves disposed on the chip body. In one aspect, using the microfluidic valve disclosed herein reduces the number of components that need to be installed on the microfluidic chip, and is easier to assemble. In one aspect, these benefits are provided by the microfluidic valve according to any of the preceding embodiments.

Figure 16:
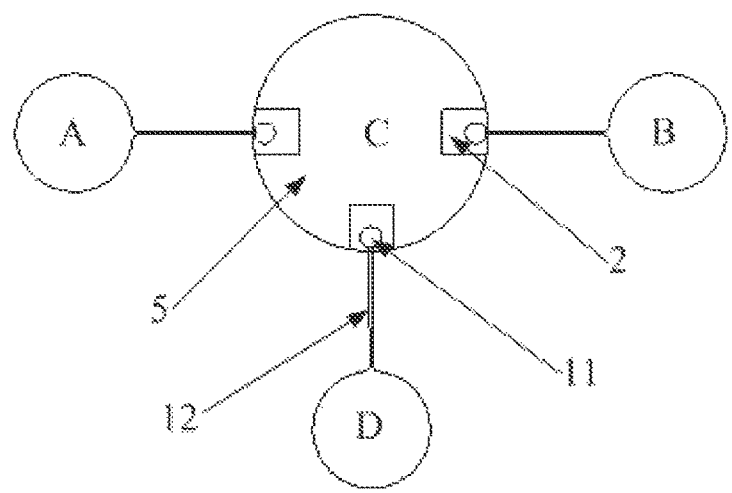
FIG. 16 shows an example of using the microfluidic valve according to one embodiment of the present disclosure. 2—micro-column, 5—mixing chamber, 11—micropore, and 12—micro-channel.

In one aspect, also provided herein is a method of using the microfluidic valve and/or chip according to any of the preceding embodiments. In one embodiment, as shown in FIG. 16, rotor 3 can be rotated in the counterclockwise or clockwise direction, in order to move micro-column 2 to open or close the micro-aperture (and the micro-channel connected to the micro-aperture, if micro-channels are used) connected to chamber A, B, or D. Liquid in chamber A and liquid in chamber B can be introduced into mixing chamber 5 individually, sequentially, or simultaneously. For example, the rotor can comprise two micro-columns, which are arranged at a 90° angle. The micro-columns can first block the micro-apertures connected to chamber B and chamber D, so that only the micro-aperture connected to chamber A is open. Liquid A is introduced into the mixing chamber. Then, the rotor is turned clockwise by 90°, so that the micro-columns now block the micro-apertures connected to chamber D and chamber A, while the micro-aperture connected to chamber B becomes open and is the only open aperture. Liquid B is then introduced into the mixing chamber. When the rotor is further turned clockwise by greater than 0° but less than 90°, then both micro-apertures connected to chamber A and chamber B are open, and liquids A and B can be introduced simultaneously into mixing chamber 5.

The two liquids (e.g., liquid A and liquid B as shown in FIG. 16) may be a viscous liquid, a non-viscous liquid, and/or a liquid reagent containing a solid particle. The mixing chamber (chamber 5 in FIG. 16) may be pre-loaded with a liquid reagent/sample and/or a solid reagent/sample, before introduction of any liquid from the micro-aperture(s). For example, mixing chamber 5 can be pre-loaded or embedded with liquid or solid reagent C, and two reagents A and B can then be introduced into mixing chamber 5 for mixing with C through agitation by micro-column 2, in order to reconstitute the solid reagent C in a solution and/or to thoroughly mix the several reagents. Under suitable conditions, the mixture of reagents, samples, or reagent(s)/sample(s) is allowed to stay in mixing chamber 5 for one or more reactions to occur directly in the chamber, and/or for subsequent detection and/or analysis of the reaction(s). In other embodiments, the reaction(s) can take place in the mixing chamber, and then a portion or all of the reaction mixture passes to chamber D for a subsequent reaction (for example, with a different reagent that cannot be present in the previous reaction(s)) for subsequent detection. In still other embodiments, the reagent(s) and/or sample(s) are simply mixed together in the mixing chamber, and then a portion or all of the mixture passes to chamber D for one or more reactions and/or detection.

In any of the preceding embodiments, a plurality of functionalities can be integrated on a single chip by using one or more of the microfluidic valves disclosed herein. For example, on a single chip, a microfluidic valve having a stirring function as disclosed herein can integrate several functions, including sample feed or application into the device, mixing, reaction, separation, and/or detection, in a streamlined process. As a result, both time and cost are saved.

In any of the preceding embodiments, the microfluidic valve or chip can employs a solid or semi-solid substrate that may be planar in structure, e.g., substantially flat or having at least one flat surface. For example, the base of the microfluidic valve can be a solid or semi-solid substrate. Suitable substrates may be fabricated from any one of a variety of materials, or combinations of materials. Often, the planar substrates are manufactured using solid substrates common in the fields of microfabrication, e.g., silica-based substrates, such as glass, quartz, silicon or polysilicon, as well as other known substrates, e.g., gallium arsenide. In the case of these substrates, common microfabrication techniques, such as photolithographic techniques, wet chemical etching, micromachining, e.g., drilling, milling and the like, may be readily applied in the fabrication of microfluidic devices and substrates. Alternatively, polymeric substrate materials may be used to fabricate the devices of the present disclosure, including, e.g., polydimethylsiloxanes (PDMS), polymethylmethacrylate (PMMA), polyurethane, polyvinylchloride (PVC), polystyrene, polysulfone, polycarbonate and the like. In the case of such polymeric materials, injection molding or embossing methods may be used to form the substrates having the channel and reservoir geometries as described herein. In such cases, original molds may be fabricated using any of the above described materials and methods.

The channels and chambers of the present microfluidic valve or chip can be fabricated into one surface of a planar substrate, as grooves, wells or depressions in that surface. A second planar substrate, typically prepared from the same or similar material, is overlaid and bound to the first, thereby defining and sealing the channels and/or chambers of the device. Together, the upper surface of the first substrate, and the lower mated surface of the upper substrate, define the interior portion of the device, i.e., defining the channels and chambers of the device. In some embodiments, the upper layer may be reversibly bound to the lower layer.

The present microfluidic valve or chip may also include sample and/or reagent sources that are external to the body of the valve or chip per se, but still in fluid communication with the sample/reagent loading channel. In some embodiments, the system may further comprise an inlet and/or an outlet to the micro-channel or chamber (such as mixing chamber 5 as shown in the drawings). In some embodiments, the system may further comprise a delivering means to introduce a sample to the micro-channel or chamber. In some embodiments, the system may further comprise an injecting means to introduce a liquid into the micro-channel or chamber. Any liquid manipulating equipment, such as pipettes, pumps, etc., may be used as an injecting means to introduce a liquid to the micro-channel or chamber.

The microfluidic valve or chip can comprise any suitable material. In one example, the microfluidic valve or chip comprises a material selected from the group consisting of a silicon, a plastic, a glass, a ceramic, a rubber, a metal, a polymer, a paper and a combination thereof. In one aspect, the microfluidic valve or chip is injection molded. In another aspect, the plastic is selected from the group consisting of polycarbonate, methyl methacrylate, polystyrene, acrylonitrile-butadiene-styrene (ABS), polyethylene and polypropylene. In still another example, the microfluidic valve or chip comprises a glass. In one aspect, the microfluidic valve or chip is fabricated by a method selected from the group consisting of gluing, dicing/cutting, slicing, anodic bonding, ultrasonic welding, and a combination thereof.

In one aspect, the present disclosure is directed to an article of manufacture, which article of manufacture comprises: a) a packaging material; b) a microfluidic valve or chip disclosed herein; optionally, c) a label indicating that the article is for an assay, for example, for assaying an analyte; and optionally, d) an instruction, for example, for using the article of manufacture for an assay.

The disclosure comprises kits comprising a microfluidic valve or chip or an assay device disclosed herein. For example, kits for diagnosing or aiding in the diagnosis of a condition or a disease (e.g., cancer) or for monitoring a condition or a disease are included. In one embodiment, the kit comprises one or more reagents for detecting one or more analytes, for example, biomarkers associated with a condition or a disease. The reagents comprise labeled compounds or agents capable of detecting a polypeptide or an mRNA encoding a polypeptide corresponding to a biomarker in a biological sample, and means for determining the absence, presence, and/or amount of the polypeptide or mRNA in the sample (e.g., an antibody which binds the polypeptide or an oligonucleotide probe which binds to DNA or mRNA encoding the polypeptide). Suitable reagents for binding with a polypeptide corresponding to a biomarker include antibodies, antibody derivatives, antibody fragments, and the like. Suitable reagents for binding with a nucleic acid (e.g., a genomic DNA, an mRNA, a spliced mRNA, a cDNA, or the like) include complementary nucleic acids. In one embodiment, the kit comprises a reference sample. In one aspect, the reference sample is used to compare the results obtained from the sample being tested. The kit can also comprise other components such as a buffering agent, a preservative, or a protein stabilizing agent. The kit can further comprise components necessary for detecting a detectable label (e.g., an enzyme or a substrate).

Each component of the kit can be enclosed within an individual container and all of the various containers can be within a single package, along with instructions for interpreting the results of the assays performed using the kit.

In one aspect, the article of manufacture or kit disclosed herein is used for diagnosing a condition or a disease in a subject, assessing the risk of a subject developing a condition or a disease, and/or evaluating prognosis of a condition or a disease in a subject, for example, following treatment of the subject with a therapy. In one aspect, the article of manufacture is used to assay a sample obtained from a subject having or suspected of having a condition or a disease.

C. Use of the Microfluidic Valve, Chip, Kit, or System

A presently disclosed microfluidic valve, chip, kit, or system can be used in any suitable application. A presently disclosed microfluidic valve, chip, kit, or system can be used in any suitable assay to improve assay precision, reproducibility, and/or sensitivity, particularly for the assays involving small reaction volumes. For instance, the microfluidic chip can be used in assaying the interaction between various moieties, e.g., nucleic acids, immunoreactions involving proteins, interactions between a protein and a nucleic acid, a ligand-receptor interaction, and small molecule and protein or nucleic acid interactions, etc.

A presently disclosed microfluidic valve, chip, kit, or system can be used to assay any analyte, e.g., a cell, a cellular organelle, a virus, a molecule and an aggregate or complex thereof. Exemplary cells include animal cells, plant cells, fungus cells, bacterium cells, recombinant cells and cultured cells. Animal, plant, fungus, bacterium cells can be derived from any genus or subgenus of the Animalia, Plantae, fungus or bacterium kingdom. Cells derived from any genus or subgenus of ciliates, cellular slime molds, flagellates and microsporidia can also be assayed by the present methods. Cells derived from birds such as chickens, vertebrates such as fish and mammals such as mice, rats, rabbits, cats, dogs, pigs, cows, ox, sheep, goats, horses, monkeys and other non-human primates, and humans can be assayed by the present methods.

A presently disclosed microfluidic valve, chip, kit, or system can be used to assay any sample. For example, the present method can be used to assay a mammalian sample. Exemplary mammals include bovines, goats, sheep, equines, rabbits, guinea pigs, murine, humans, felines, monkeys, dogs and porcines. The present microfluidic chip can also be used to assay a clinical sample. Exemplary clinical samples include serum, plasma, whole blood, sputum, cerebral spinal fluid, amniotic fluid, urine, gastrointestinal contents, hair, saliva, sweat, gum scrapings and tissue from biopsies. Preferably, the present microfluidic chip is used to assay a human clinical sample.

Any suitable reagents can be used in an assay conducted using a presently disclosed microfluidic valve or chip. The assay can be conducted entirely or only partially within the microfluidic valve or chip. In one aspect, the reagents used in the present disclosure bind or interact specifically with an analyte in a sample. Exemplary reagents include cells, cellular organelles, viruses, molecules and an aggregate or complex thereof. In one aspect, the reagent is an antibody, or a nucleic acid.

The present microfluidic valve or chip comprising the valve can be used in any suitable assay format, for example, in a direct assay format, a sandwich assay format or a competition assay format. In one embodiment, a different plurality of reagents are used to assay a single analyte. In another embodiment, a different plurality of reagents are used to assay a different plurality of analytes. In still another embodiment, a plurality of reagents are attached to the inner surface of the reaction chamber, and is used, for example, to assay one or more analytes in one or more samples.

Microfluidic valves and chips of the present disclosure can be used in a variety of applications and reactions, including but not limited to, nucleic acid amplification reactions, biochemical reactions, immune reactions, and so on.

Various modifications to these embodiments by those skilled in the art will be readily apparent, the general principles defined herein may be made without departing from the spirit or scope of the present disclosure in the case of, implemented in the other embodiment. Thus, the present disclosure will not be limited to these embodiment illustrated herein, but rather conforms to the principles and novel features disclosed herein the broadest scope of consistent.

The following embodiments are intended to further describe and illustrate various aspects of the present disclosure, but not to limit, the scope of the present disclosure in any manner, shape, or form, either explicitly or implicitly.

Embodiment 1: A microfluidic valve, characterized in that the valve comprises:
a base (1) comprising a micropore;
a sleeve (4) disposed on the base (1);
a rotatable rotor (3) disposed within the sleeve (4), located on the end of the sleeve (4) away from of the base (1), wherein the rotor (3), the sleeve (4), and the base (1) form a mixing chamber (5), and the micropore is capable of communicating with the mixing chamber (5); and
a micro-column (2) disposed on the rotor (3) and located in the mixing chamber (5), wherein the micro-column (2) is capable of blocking or closing the communication between the micropore and the mixing chamber (5).

Embodiment 2: The microfluidic valve of Embodiment 1, characterized in that the rotor (3), on its end surface away from the base (1), comprises an interface structure (32) for rotating the rotor (3), wherein the interface structure (32) optionally comprises a bump and/or a groove for rotating the rotor (3).

Embodiment 3: The microfluidic valve of Embodiment 1, characterized in that the sleeve (4), on its end away from the base (1), comprises an inward annular protuberance, wherein the inward annular protuberance secures the position of the rotor (3) inside the sleeve (4) along the axis of the sleeve (4).

Embodiment 4. The microfluidic valve of Embodiment 1, characterized in that:
the end surface of the sleeve (4) away from the base (1) is flush with or higher than the end surface of the rotor (3) away from the base (1);
the microfluidic valve further comprises a cover plate (6) connected to the sleeve (4), wherein the cover plate (6), on its end surface toward the base (1), comprises an annular groove to secure the position of the sleeve (4) and the rotor (3) along the axis of the sleeve (4);
the cover plate (6) further comprises an operating through-hole (61) connected with the annular groove, wherein operating through-hole (61) is capable of exposing the rotor (3) to the outside of the microfluidic valve.

Embodiment 5. The microfluidic valve of Embodiment 4, characterized in that the microfluidic valve comprises a plurality of sleeves (4) and a plurality of annular grooves on the cover plate (6), wherein each sleeve (4) corresponds to an annular groove on the cover plate (6).

Embodiment 6. The microfluidic valve of Embodiment 1, characterized in that:
the microfluidic valve comprises two micropores; and
the microfluidic valve comprises a first micro-column, a second micro-column, and a third micro-column,
wherein the first micro-column and the third micro column are disposed on opposite sides of the rotor (3), and configured to be able to close or open the two micropores simultaneously, and wherein the second micro-column is configured to be able to close or open one of the two micropores individually.

Embodiment 7. The microfluidic valve of Embodiment 1, characterized in that:
the end of the sleeve (4) toward the base (1) and the end of the micro-column (2) toward the base (1) are at least partially embedded in the base (1),
the base (1), on its surface toward the micro-column (2), comprises an annular groove (13) which is capable of engaging the micro-column (2), and the end of the micro-column (2) toward the base (1) is configured to be able to slide within the annular groove (13),
a resilient gasket is provided between the sleeve (4) and an outside wall of the micro-column (2), and
the micropore is provided on the resilient gasket and between the connecting end surfaces of the sleeve (4) and the base (1), wherein the outside wall of the micro-column (2) is configured to be able to block or close the micropore.

Embodiment 8. The microfluidic valve of Embodiment 1, characterized in that:
the micropore is provided in the direction along the thickness of the base (1), and
the end surfaces of the micro-column (2) away from the rotor (3) is configured to be able to block or close the micropore.

Embodiment 9. The microfluidic valve of Embodiment 8, characterized in that:
the rotor (3), on the circumference of the end surface toward the base (1), comprises a guiding sleeve (31), wherein the guiding sleeve (31) rotates with the sleeve (4), and the micro-column (2) is provided on the guiding sleeve (31).

Embodiment 10. The microfluidic valve of any of Embodiments 1-9, characterized in that:
the micropore comprises a chamber (11) and a microchannel (12), and the microchannel (12) is configured to communicate with the mixing chamber (5) through the chamber (11),
the chamber (11) comprises a first section proximal to the mixing chamber (5) and a second section distal to the mixing chamber (5), and
the ratio of the diameters of the first section and the second section is between about 1:3 and about 1:10, and the diameter of the micropore is larger than about one percent of the diameter of the rotor (3) and smaller than about ½ of the diameter of the rotor (3).

Embodiment 11. A microfluidic chip, characterized in that it comprises a chip body and one or more of the microfluidic valve according to any of the preceding embodiments.

The invention claimed is:

1. A microfluidic valve, comprising:
a base;
a sleeve disposed on the base;
a rotor disposed within the sleeve and located at the end of the sleeve away from the base, wherein the rotor, the sleeve, and the base form a mixing chamber;
an aperture in the base capable of communicating or configured to communicate with the mixing chamber; and
a micro-column disposed on the rotor and located in the mixing chamber, wherein the micro-column is capable of blocking or closing or configured to block or close the communication between the aperture and the mixing chamber.

2. The microfluidic valve of claim 1, wherein the micro-column comprises a feature for facilitating mixing or stirring of a substance inside the mixing chamber.

3. The microfluidic valve of claim 1, wherein the rotor, on its end surface distal to the base, comprises an interface structure for rotating the rotor, wherein the interface structure comprises a protuberance, a groove, or a combination thereof.

4. The microfluidic valve of claim 1, wherein the sleeve, on its end distal to the base, comprises an inward annular protuberance, wherein the inward annular protuberance secures the position of the rotor inside the sleeve along the axis of the sleeve.

5. The microfluidic valve of claim 1, wherein an end surface of the sleeve distal to the base is flush with or higher than an end surface of the rotor distal to the base.

6. The microfluidic valve of claim 1, which further comprises a cover plate fixed or releasably connected to the sleeve, wherein the cover plate on its end surface proximal to the base, comprises an annular groove to secure the position of the sleeve and the rotor along the axis of the sleeve.

7. The microfluidic valve of claim 1, comprising a plurality of sleeves, wherein each of the plurality of sleeves corresponds to an annular groove on the cover plate.

8. The microfluidic valve of claim 1, comprising one or more apertures, wherein the one or more apertures are micropores.

9. The microfluidic valve of claim 8, comprising a first micro-column, a second micro-column, and a third micro-column on the rotor.

10. The microfluidic valve of claim 9, wherein the first micro-column and the third micro column are disposed on opposite sides of the rotor and configured to close or open or capable of closing or opening two micropores simultaneously, and the second micro-column is configured to close or open or capable of closing or opening one of the micropores individually.

11. The microfluidic valve of claim 1, wherein the end of the sleeve proximal to the base is at least partially embedded in the base, and/or the end of the micro-column on the rotor proximal to the base is at least partially embedded in the base.

12. The microfluidic valve of claim 1, wherein the base, on its surface proximal to the rotor, comprises an annular groove capable of engaging or configured to engage the micro-column on the rotor, and an end of the micro-column proximal to the base is configured to slide or capable of sliding within the annular groove.

13. The microfluidic valve of claim 1, wherein a resilient gasket is provided between the sleeve and an outside wall of the micro-column on the rotor, the aperture is provided on the resilient gasket and between the connecting end surfaces of the sleeve and the base, and the outside wall of the micro-column on the rotor is configured to block or close or capable of blocking or closing the aperture.

14. The microfluidic valve of claim 1, wherein the aperture is provided in the direction along the thickness of the base, the micro-column on the rotor has an end surface proximal to the base, and the end surface is configured to block or close or capable of blocking or closing the aperture.

15. The microfluidic valve of claim 1, wherein the rotor, on the circumference of an end surface proximal to the base, comprises a guiding sleeve, the guiding sleeve is configured to rotate with the sleeve, and the micro-column on the rotor is provided on the guiding sleeve.

16. The microfluidic valve of claim 1, wherein the aperture comprises an aperture chamber and a channel, wherein the channel is configured to communicate with the mixing chamber through the aperture chamber.

17. The microfluidic valve of claim 16, wherein the aperture chamber comprises a first section proximal to the mixing chamber and a second section distal to the mixing chamber, wherein the ratio of the diameters of the first section and the second section is between about 1:3 and about 1:10.

18. The microfluidic valve of claim 1, wherein the diameter of the aperture is larger than about one percent of the diameter of the rotor, and/or the diameter of the aperture is smaller than about ½ of the diameter of the rotor.

19. A microfluidic chip, comprising:
a chip body, and
one or more microfluidic valve disposed on the chip body, wherein the microfluidic valve comprises:
a base;
a sleeve disposed on the base;
a rotor disposed within the sleeve located at the end of the sleeve away from the base, wherein the rotor, the sleeve, and the base form a mixing chamber;
an aperture in the base capable of communicating or configured to communicate with the mixing chamber; and
a micro-column disposed on the rotor and located in the mixing chamber, wherein the micro-column is capable of blocking or closing or configured to block or close the communication between the aperture and the mixing chamber.

20. A system, comprising one or more microfluidic chip and a means for detecting a reaction in the microfluidic chip,
wherein the microfluidic chip comprises a chip body and one or more microfluidic valves disposed on the chip body, where each microfluidic valve comprises:
a base;
a sleeve disposed on the base;
a rotor disposed within the sleeve located at the end of the sleeve away from the base, wherein the rotor, the sleeve, and the base form a mixing chamber;
an aperture in the base capable of communicating or configured to communicate with the mixing chamber; and
a micro-column disposed on the rotor and located in the mixing chamber, wherein the micro-column is capable of blocking or closing or configured to block or close the communication between the aperture and the mixing chamber.

21. A kit, comprising one or more microfluidic chip, and one or more reagents for performing a reaction in the microfluidic chip,
wherein the microfluidic chip comprises a chip body and one or more microfluidic valves disposed on the chip body, where each microfluidic valve comprises:
a base;
a sleeve disposed on the base;
a rotor disposed within the sleeve located at the end of the sleeve away from the base, wherein the rotor, the sleeve, and the base form a mixing chamber;
an aperture in the base capable of communicating or configured to communicate with the mixing chamber; and
a micro-column disposed on the rotor and located in the mixing chamber, wherein the micro-column is capable of blocking or closing or configured to block or close the communication between the aperture and the mixing chamber.

22. A method of using a microfluidic valve, wherein the microfluidic valve comprises:
a base;
a sleeve disposed on the base;
a rotor disposed within the sleeve located at the end of the sleeve away from the base, wherein the rotor, the sleeve, and the base form a mixing chamber;
an aperture in the base capable of communicating or configured to communicate with the mixing chamber; and
a micro-column disposed on the rotor and located in the mixing chamber, wherein the micro-column is capable of blocking or closing or configured to block or close the communication between the aperture and the mixing chamber;
and wherein the method comprises:
1) turning the rotor to open the aperture of the microfluidic valve;
2) introducing a liquid in the mixing chamber via the aperture; and
3) turning the rotor to stir or agitate the liquid in the mixing chamber to mix the substances in the liquid.

* * * * *